United States Patent
Emura et al.

(10) Patent No.: US 12,188,800 B2
(45) Date of Patent: Jan. 7, 2025

(54) THERMAL FLOW METER, FLOW RATE CONTROL DEVICE, THERMAL FLOW RATE MEASUREMENT METHOD, AND PROGRAM FOR THERMAL FLOW METER

(71) Applicant: HORIBA STEC, Co., Ltd., Kyoto (JP)

(72) Inventors: Hidetoshi Emura, Kyoto (JP); Hiroyuki Okano, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 253 days.

(21) Appl. No.: 18/002,464

(22) PCT Filed: Dec. 11, 2020

(86) PCT No.: PCT/JP2020/046330
§ 371 (c)(1),
(2) Date: Dec. 19, 2022

(87) PCT Pub. No.: WO2022/004001
PCT Pub. Date: Jan. 6, 2022

(65) Prior Publication Data
US 2023/0236051 A1   Jul. 27, 2023

(30) Foreign Application Priority Data
Jul. 2, 2020   (JP) .................................. 2020-114762

(51) Int. Cl.
*G01F 1/69* (2006.01)
*G01F 1/698* (2006.01)

(52) U.S. Cl.
CPC ................ *G01F 1/69* (2013.01); *G01F 1/698* (2013.01)

(58) Field of Classification Search
CPC .......... G01F 1/69; G01F 1/698; G01F 1/6847; G01F 1/696; G01F 1/6965; G01F 5/00;
(Continued)

(56) References Cited

U.S. PATENT DOCUMENTS

| | | | | |
|---|---|---|---|---|
| 5,705,957 A | * | 1/1998 | Oka | H03L 1/026 331/158 |
| 2004/0204885 A1 | * | 10/2004 | Wang | G01F 25/10 702/45 |

(Continued)

FOREIGN PATENT DOCUMENTS

| | | | | |
|---|---|---|---|---|
| CN | 114545983 A | * | 5/2022 | ............. G01F 1/363 |
| JP | 2008506117 A | | 2/2008 | |

(Continued)

OTHER PUBLICATIONS

ISA Japan Patent Office, International Search Report Issued in Application No. PCT/JP2020/046330, Feb. 9, 2021, WIPO, 4 pages.

*Primary Examiner* — Francis C Gray
(74) *Attorney, Agent, or Firm* — Alleman Hall & Tuttle LLP

(57) ABSTRACT

The present invention provides a thermal flow meter that includes a sensor flow path along which flows a fluid being measured, an upstream-side electrical resistance element provided on the sensor flow path, a downstream-side electrical resistance element provided downstream of the upstream-side electrical resistance element, a sensor output generator that, based on respective voltages that are output in accordance with changes in the upstream-side and downstream-side electrical resistance elements, generates a sensor output in accordance with the flow rate of the fluid being measured, a slope effect estimator that, based on at least a Prandtl number of the fluid being measured, estimates a slope effect that is generated in the sensor output in accordance with an attitude of the sensor flow path, and a flow rate calculator that corrects the slope effect from the sensor output, and calculates the flow rate of the fluid being measured.

12 Claims, 10 Drawing Sheets

(58) Field of Classification Search
CPC ........ G01F 15/005; G01F 1/684; G01F 25/10; G06F 17/10
See application file for complete search history.

(56) References Cited

U.S. PATENT DOCUMENTS

| | | | |
|---|---|---|---|
| 2008/0000283 A1* | 1/2008 | Wang | G01F 25/10 73/1.16 |
| 2009/0061541 A1 | 3/2009 | Moriya et al. | |
| 2011/0125445 A1 | 5/2011 | Ebi et al. | |
| 2014/0224004 A1* | 8/2014 | Ariyoshi | G01F 1/69 73/114.34 |
| 2016/0209255 A1* | 7/2016 | Doi | G01F 1/696 |
| 2021/0131847 A1* | 5/2021 | Matsumoto | G01F 1/692 |

FOREIGN PATENT DOCUMENTS

| | | | | |
|---|---|---|---|---|
| KR | 20160053844 A * | 5/2016 | | G01F 1/698 |
| WO | 2006014537 A1 | 2/2006 | | |
| WO | 2007023614 A1 | 3/2007 | | |
| WO | 2007138941 A1 | 12/2007 | | |

\* cited by examiner (a) INFLOW PORT FACING DOWNWARDS (b) INFLOW PORT FACING UPWARDS (a) INFLOW PORT FACING DOWNWARDS (b) INFLOW PORT FACING UPWARDS

THERMAL FLOW METER, FLOW RATE CONTROL DEVICE, THERMAL FLOW RATE MEASUREMENT METHOD, AND PROGRAM FOR THERMAL FLOW METER

TECHNICAL FIELD

The present invention relates to a thermal flow meter that measures a flow rate that is to be measured based on an output obtained from an upstream-side electrical resistance element and a downstream-side electrical resistance element that are provided on a sensor flow path along which is flowing a fluid to be measured.

TECHNICAL BACKGROUND

In, for example, a semiconductor manufacturing process, a thermal mass flow controller is used in order to supply various types of gases at desired constant flow rates. A thermal mass flow controller is provided with a block body in which is formed an internal flow path through which a gas flows approximately in a predetermined direction, a thermal flow meter and fluid control valves that are provided on the block body, and a control board that governs control of the fluid control valves and the like.

The thermal flow meter is equipped with a sensor flow path which is a substantially U-shaped capillary that branches off from the internal flow path, which is the main flow path, and then subsequently rejoins the internal flow path. An upstream-side electrical resistance element and a downstream-side electrical resistance element are provided at a portion on this sensor flow path where the internal flow path inside the block body is oriented in substantially the same direction as the flow direction of the fluid (i.e., gas). The voltages that are applied to the respective electrical resistance elements are controlled in such a way that the temperature of each resistance element remains constant. Because the voltage differential applied to each electrical resistance element changes in accordance with the flow rate of the gas flowing through the sensor flow path, it is possible to calculate the flow rate of the gas from the voltage differential.

However, as is shown by the arrow in FIG. 10 at (a), it is standard for a packaged flow rate control device such as a mass flow controller to be designed so as to be horizontally disposed in such a way that the gas flows substantially in a horizontal direction. Because of this, if a flow rate control device is vertically disposed in such a way that, as is shown by the arrows in FIG. 10 at (b), the gas flows in a vertical direction, then due to what is known as a thermosiphon effect, the zero-point output from the thermal flow meter shifts in accordance with the mounting orientation and the pressure of the sealed gas. In other words, in spite of the fact that a value of zero ought to be output as the output from the flow rate control device, a value other than zero is output because of the convection generated within the sensor flow path by this thermosiphon effect. This consequently causes measurement errors to occur.

In order to reduce this type of measurement errors, providing a flow rate control device with a gyro sensor so that the zero-point output can be corrected in accordance with a detected attitude has been suggested in Patent Document 1.

However, because a thermosiphon effect is caused not only by the attitude of the flow rate control device, but also by the values of the pressure of the gas, and/or thermophysical properties such as the thermal conductivity and the specific heat like of the gas being measured, it is difficult to perform corrections at a satisfactory level of accuracy simply by using the correction method described in Patent Document 1.

DOCUMENTS OF THE PRIOR ART

Patent Documents

Patent Document 1 Japanese Unexamined Patent Application Publication (JP-A) No. 2008-506117

DISCLOSURE OF THE INVENTION

Problems to be Solved by the Invention

The present invention was conceived in view of the above-described circumstances, and it is an object thereof to provide a thermal flow meter that is able to correct errors caused by a thermosiphon effect at a greater level of accuracy than is possible conventionally.

Means for Solving the Problem

In other words, a thermal flow meter according to the present invention includes a sensor flow path along which flows a fluid being measured, an upstream-side electrical resistance element that is provided on the sensor flow path, a downstream-side electrical resistance element that is provided on the sensor flow path on the downstream side from the upstream-side electrical resistance element, a sensor output generator that, based on voltages output from a flow rate detector circuit that includes the upstream-side electrical resistance element and the downstream-side electrical resistance element, generates a sensor output in accordance with the flow rate of the fluid being measured, a slope effect estimator that, based on at least a Prandtl number of the fluid being measured, estimates a slope effect that is generated in the sensor output in accordance with an attitude of the sensor flow path, and a flow rate calculator that corrects the slope effect from the sensor output, and calculates the flow rate of the fluid being measured.

Moreover, a thermal flow rate measurement method according to the present invention is a flow rate measurement method in which a thermal flow meter that includes a sensor flow path along which flows a fluid being measured, an upstream-side electrical resistance element that is provided on the sensor flow path, and a downstream-side electrical resistance element that is provided on the sensor flow path on the downstream side from the upstream-side electrical resistance element is employed, and in which, based on voltages output from a flow rate detector circuit that includes the upstream-side electrical resistance element and the downstream-side electrical resistance element, a sensor output is generated in accordance with the flow rate of the fluid being measured, and, based on at least a Prandtl number of the fluid being measured, a slope effect that is generated in the sensor output in accordance with an attitude of the sensor flow path is estimated, and the slope effect is corrected from the sensor output, and the flow rate of the fluid being measured is calculated.

If this type of structure and method are employed, then because the slope effect estimator estimates the slope effect based on a Prandtl number, which is a value that is determined in accordance with the physical properties of the fluid being measured and is affected by the pressure and thermal conductivity of the fluid, it is possible to estimate an attitude effect that takes the effects from these into account. Because of this, it is possible to correct measurement errors caused by a thermosiphon effect at a greater level of accuracy than is possible conventionally. In addition, it is possible to correct measurement errors caused by a thermosiphon effect solely by making a change to the software, and without making any change from a regular thermal flow meter as far as the hardware that is used is concerned.

Furthermore, in order to enable any effect that is associated with the size of the convection generated in the sensor flow path to also be corrected, while enabling the slope effect to be associated with the respective voltages that are applied to the upstream-side electrical resistance element and the downstream-side electrical resistance element, and thereby enable the slope effect contained in a sensor output to be easily corrected by means of a calculation, it is preferable that the slope effect estimator be formed so as to estimate the slope effect based on a Nusselt number, a Grashof number, and a Prandtl number of the fluid being measured.

As an example of a specific usage mode of the respective parameters that are used to estimate the slope effect, if a Nusselt number is denoted by Nu, a Grashof number is denoted by Gr, a Prandtl number is denoted by Pr, a constant of proportionality is denoted as A, and an index is denoted by n, then the slope effect estimator may be formed so as to calculate the slope effect based on $Nu=A(Gr \times Pr)^n$.

In order to enable a Nusselt number to be determined via calculation without making any direct measurement, and to thereby enable the slope effect to be calculated, it is preferable, in a case in which an upstream-side voltage output from a circuit that includes the upstream-side electrical resistance element is denoted by Vu, and a downstream-side voltage output from a circuit that includes the downstream-side electrical resistance element is denoted by Vd, that the sensor output generator be formed so as to output $(Vu-Vd)/(Vu+Vd)$ as the sensor output, that the slope effect be a voltage differential $(Vu0-Vd0)$ generated by a convection within the sensor flow path, and the slope effect estimator be formed so as to estimate the voltage differential $(Vu0-Vd0)$ from a value of the Nusselt number that is calculated from a relational expression between the Nusselt number Nu and the voltage differential $(Vu0-Vd0)$, and from $Nu=A(Gr \times Pr)^n$, and that the flow rate calculator correct the slope effect by subtracting the voltage differential $(Vu0-Vd0)$ from a numerator $(Vu-Vd)$ of the sensor output.

In order to enable a Nusselt number Nu that is suitable for the sensor flow path used in a thermal flow meter to be calculated accurately from the Grashof number and the Prandtl number, it is preferable that an index n that has been calculated based on experiments be used and, for example, a calculation formula $Nu=A(Gr \times Pr)^2$ in which the index $n=2$ may be used.

The following is an example of a specific arithmetic formula that can be used in the slope effect estimator. In a case in which an internal diameter of the sensor flow path is denoted by L, a resistance value of the upstream-side electrical resistance element or the downstream-side electrical resistance element is denoted by R, a thermal conductivity of the fluid being measured is denoted by $\lambda$, a molar specific heat at constant pressure of the fluid being measured is denoted by Cp, a viscosity of the fluid being measured is denoted by $\eta$, a density of the fluid being measured is denoted by $\rho$, a gravitational acceleration is denoted by g, a volumetric expansion of the fluid being measured is denoted by $\beta$, and a temperature differential between the upstream-side electrical resistance element or the downstream-side electrical resistance element and the fluid being measured is denoted by $\Delta T$, then $Nu=L \times \{((Vu0-Vd0)^2/R)/(L^2 \times \Delta T)\}/\pi$, $Pr=Cp\eta/\lambda$, and $Gr=\rho g L^3 \beta \Delta T/\eta^2$.

An example of a specific structure of the above-described slope effect estimator is a structure in which the slope effect estimator is provided with a pressure acquisition portion that acquires a pressure P of the fluid being measured, a temperature differential acquisition portion that acquires the temperature differential $\Delta T$ between the upstream-side electrical resistance element or the downstream-side electrical resistance element and the fluid being measured, a Nusselt number calculating portion that, based on the acquired pressure P and temperature differential $\Delta T$, calculates the Grashof number Gr and the Prandtl number Pr, and then, by substituting the respective values into a formula $Nu=A(Gr \times Pr)^n$, calculates a value of the Nusselt number Nu, and a zero-point output calculating portion that calculates the voltage differential $(Vu0-Vd0)$ from the calculated value of the Nusselt number Nu.

If there is provided a flow rate control device that is provided with the thermal flow meter according to the present invention, a fluid control valve, and a valve controller that, based on a deviation between a set flow rate and a flow rate of a fluid being measured that has been output by the thermal flow meter, controls an aperture of the fluid control valve, then it is possible to achieve accurate flow rate control based on a flow rate in which measurement errors that are caused by a thermosiphon effect are corrected.

In order to ensure that the temperatures of the upstream-side electrical resistance element and the downstream-side electrical resistance element are kept constant, and to enable a flow rate to be calculated from changes in the upstream-side voltage and the downstream-side voltage at that time, it is preferable that the flow rate detector circuit be provided with an upstream-side constant temperature control circuit having a bridge circuit that includes the upstream-side electrical resistance element, and a downstream-side constant temperature control circuit having a bridge circuit that includes the downstream-side electrical resistance element. If this type of structure is employed, then by using the above-described correction method, it is possible to suitably correct errors in a zero-point output that are caused by a slope effect.

An example of another type of thermal flow rate sensor to which the correction method of the present invention can be applied is one that is provided with a bridge circuit that includes the upstream-side electrical resistance element and the downstream-side electrical resistance element, and a constant current circuit that supplies a constant current to the bridge circuit.

In order to make it possible to achieve the same type of effects from an existing thermal flow meter as those obtained from the thermal flow meter according to the present invention simply by updating a program, it is preferable to employ a program for a thermal flow meter that is used in a thermal flow rate sensor that includes a sensor flow path along which flows a fluid being measured, an upstream-side electrical resistance element that is provided on the sensor flow path, and a downstream-side electrical resistance element that is provided on the sensor flow path on the downstream side from the upstream-side electrical resistance element, and that is characterized in causing a computer to perform functions of a sensor output generator that, based on an upstream-side voltage that is output in accordance with changes in the upstream-side electrical resistance element and on a downstream-side voltage that is output in accordance with changes in the downstream-side electrical resistance element, generates a sensor output in accordance with the flow rate of the fluid being measured, a slope effect estimator that, based on at least a Prandtl number of the fluid being measured, estimates a slope effect that is generated in the sensor output in accordance with an attitude of the sensor flow path, and a flow rate calculator that corrects the slope effect from the sensor output, and calculates the flow rate of the fluid being measured.

Note that the program for a thermal flow rate meter may be distributed electronically, or may be recorded on a program recording medium such as a CD, DVD, or flash memory or the like.

Effects of the Invention

Because the thermal flow meter of the present invention estimates a slope effect based on a Prandtl number of a fluid being measured, it is possible to also take into account the effects on a slope effect that are due to pressure and to differences between the thermal conductivities of fluids. Accordingly, it is possible to correct errors when measuring a flow rate that are caused by a thermosiphon effect at a greater level of accuracy than is possible conventionally.

DESCRIPTION OF THE REFERENCE CHARACTERS

200 . . . Flow Rate Control Device (Mass Flow Controller)
IN . . . Inflow Port
1 . . . Block Body
V . . . Control Valve
C . . . Control Device
2 . . . Main Flow Path
3 . . . Diverting Element
100 . . . Thermal Flow Meter
SP . . . Flow Rate Detector Circuit
Ru . . . Upstream-Side Electrical Resistance Element
Rd . . . Downstream-Side Electrical Resistance Element
4 . . . Sensor Flow Path
5 . . . Sensor Output Generator
6 . . . Slope Effect Estimator
7 . . . Flow Rate Calculator

BEST EMBODIMENTS FOR IMPLEMENTING THE INVENTION

A thermal flow meter 100 and a flow rate control device 200 that is provided with this thermal flow meter 100 of the present embodiment are used to supply a plurality of different types of gases that contain component gases such as, for example, $SF_6$ and the like at set flow rates to an interior of a vacuum chamber in, for example, a semiconductor manufacturing process.

Figure 1:
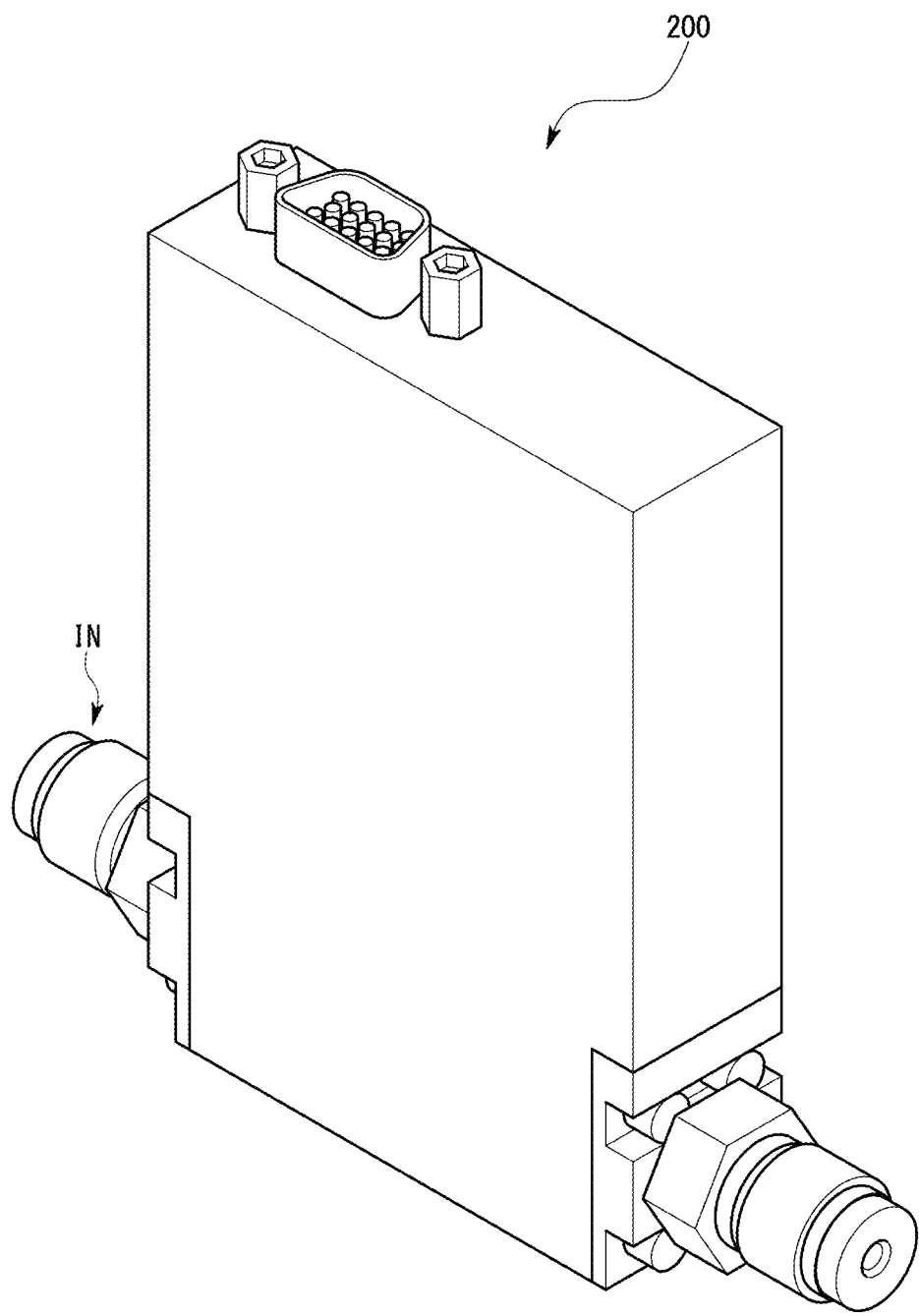
FIG. 1 is a schematic perspective view of a mass flow controller provided with a thermal flow meter according to an embodiment of the present invention.
Figure 2:
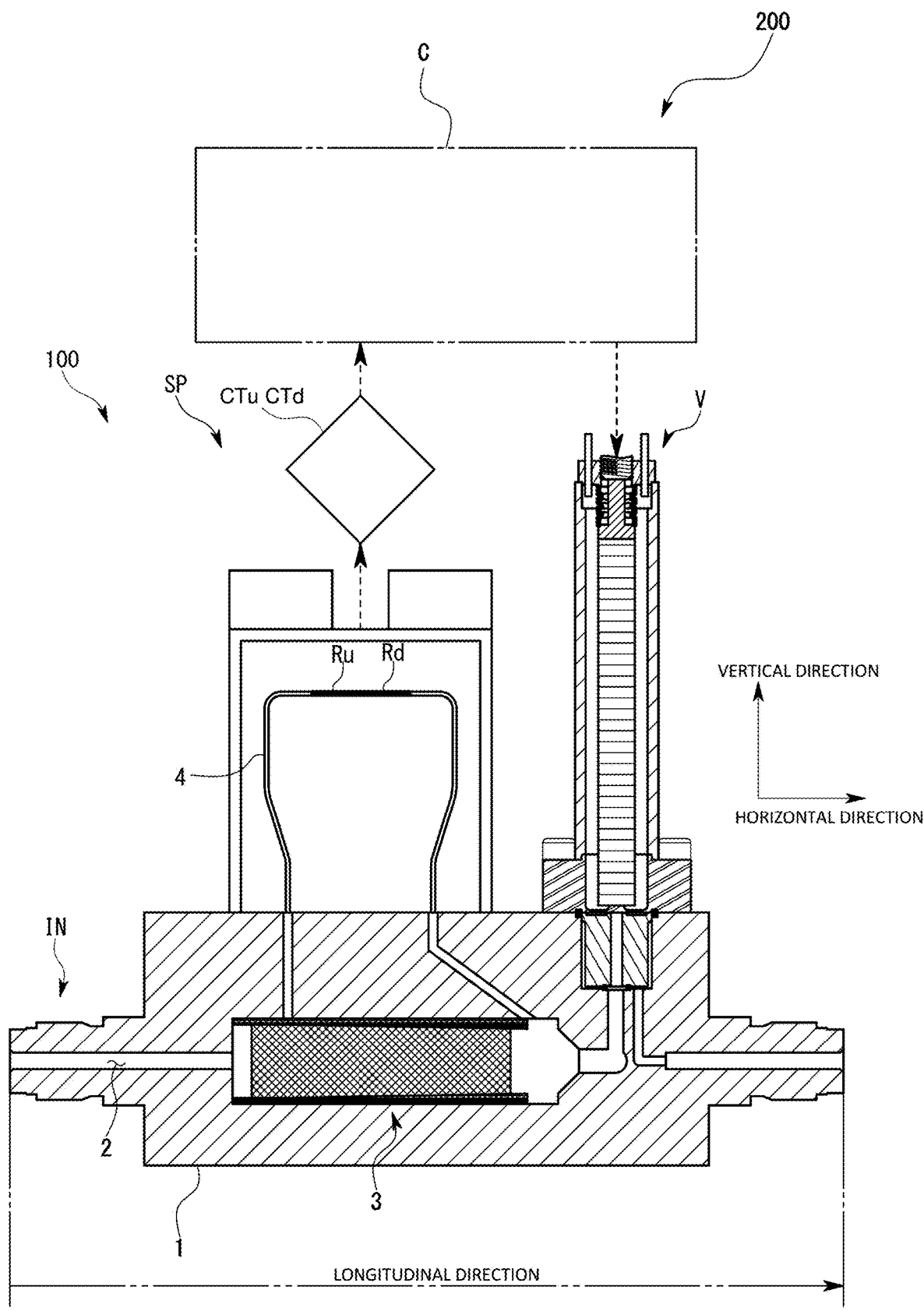
FIG. 2 is a schematic diagram of the mass flow controller according to the same embodiment.

As is shown in FIG. 1, the flow rate control device 200 is formed having a thin rectangular parallelepiped shaped outer configuration, and is used by being connected to a line through which a component gas is flowing. As is shown in FIG. 2, the flow rate control device 200 is provided with a block body 1 that is connected to the line through which a gas is flowing, and that has a main flow path 2, which forms a portion of this line, formed as an internal flow path, the thermal flow meter 100 that is mounted on a part-mounting surface of the block body 1, a control valve V that is mounted on a downstream side from the thermal flow meter 100, and a control device C that governs the control of at least the control valve V. In other words, the flow rate control device 200 is what is known as a mass flow controller in which those instruments that are necessary for performing flow rate control, namely, the block body 1, the thermal flow meter 100, the control valve V, and the control device C are packaged into a unit.

Figure 10:
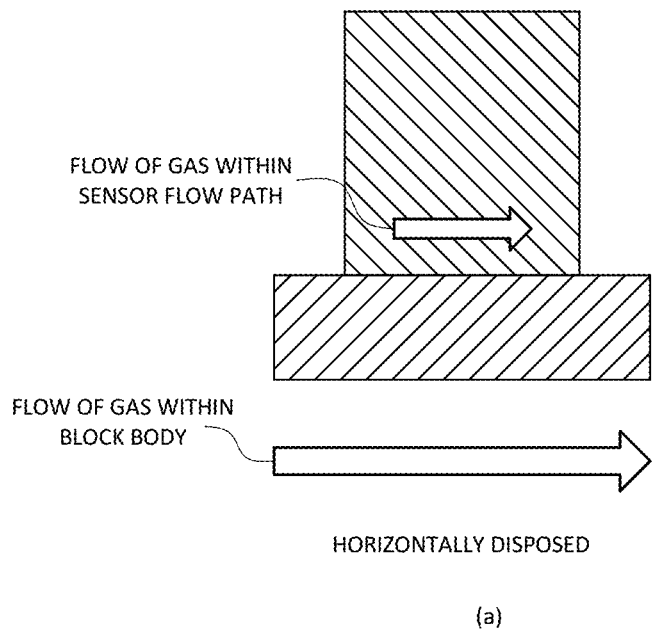
FIG. 10 is a schematic diagram showing mounting directions of a mass flow controller.
Figure 10:
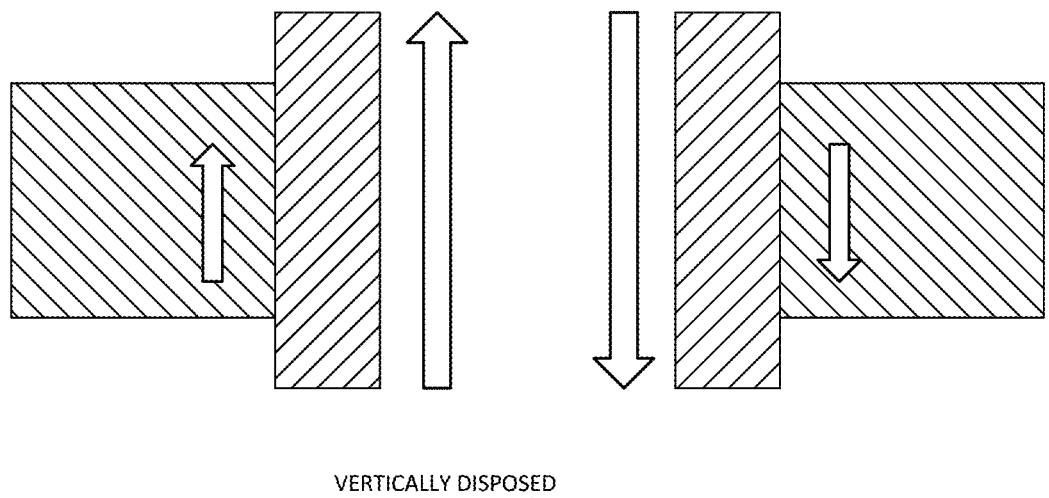

Here, as is shown in FIG. 2, in the flow rate control device 200, the block body 1 is formed having an elongated rectangular parallelepiped shaped outer configuration, and the main flow path 2 is formed extending in the direction of this elongation. The flow rate control device 200 is designed such that the standard orientation thereof is an orientation in which the control device 200 is mounted in such a way that a longitudinal direction of the block body 1 coincides with a horizontal direction. In other words, in a case in which, as is shown in FIG. 10 at (b), the flow rate control device 200 is vertically disposed such that the gas inside the main flow path 2 flows in a vertical direction, errors are generated in a zero-point output of the flow rate output from the thermal flow meter 100 due to a thermosiphon effect. The thermal flow meter 100 of the present embodiment is provided with a structure that corrects a slope effect, which is an error in the zero-point output that is caused by a thermosiphon effect.

The control device C is what is known as a computer that is provided with a CPU, memory, an A/D converter, a D/A converter, and various input/output tools, and that is formed such that, upon a program stored in the memory thereof being executed so as to cause the various devices to operate in mutual collaboration, the control device C performs the functions of a calculator CAL of the thermal flow meter 100, and the functions of a valve controller 9 that controls an aperture of a control valve. The valve controller 9 performs feedback control on the aperture of the control valve V so that any deviation between a measured flow rate output from the calculator CAL of the thermal flow meter and a set flow rate that has been set by a user is reduced.

Next, the thermal flow meter 100 will be described in detail.

As is shown in FIG. 2, the thermal flow meter 100 is provided with a sensor flow path 4 having a U-shaped configuration that branches off from the main flow path 2 along which gas is flowing, and merges once again with the main flow path 2 at a merging point located on the downstream side of the branch point, and with a diverting element 3 that is provided on the main flow path 2 between the branch point and the merge point and serves as a resistance element.

The diverting element 3 splits the flow at a predetermined diversion ratio between the main flow path 2 and the sensor flow path 4, and is formed by a resistance component such as a bypass element having constant flow characteristics. A resistance component formed by inserting a plurality of narrow tubes into an outer pipe, or by stacking a plurality of thin circular plates in each of which are formed a plurality of through holes, or the like may be used as the diverting element 3.

As is shown in FIG. 2, the sensor flow path 4 is formed from metal (for example, stainless steel) as a capillary having a U-shaped configuration. A portion of a flow rate detector circuit SP that is used to detect the flow rate of a gas is provided on a portion of the sensor flow path 4 that is disposed in parallel with the flow direction of the main flow path 2, in other words, is parallel with the direction of elongation of the block body 1. The flow rate detector circuit SP detects the flow rate of a gas using the movement of heat that is generated by the flow of the gas that has been diverted onto the sensor flow path 4.

Figure 3:
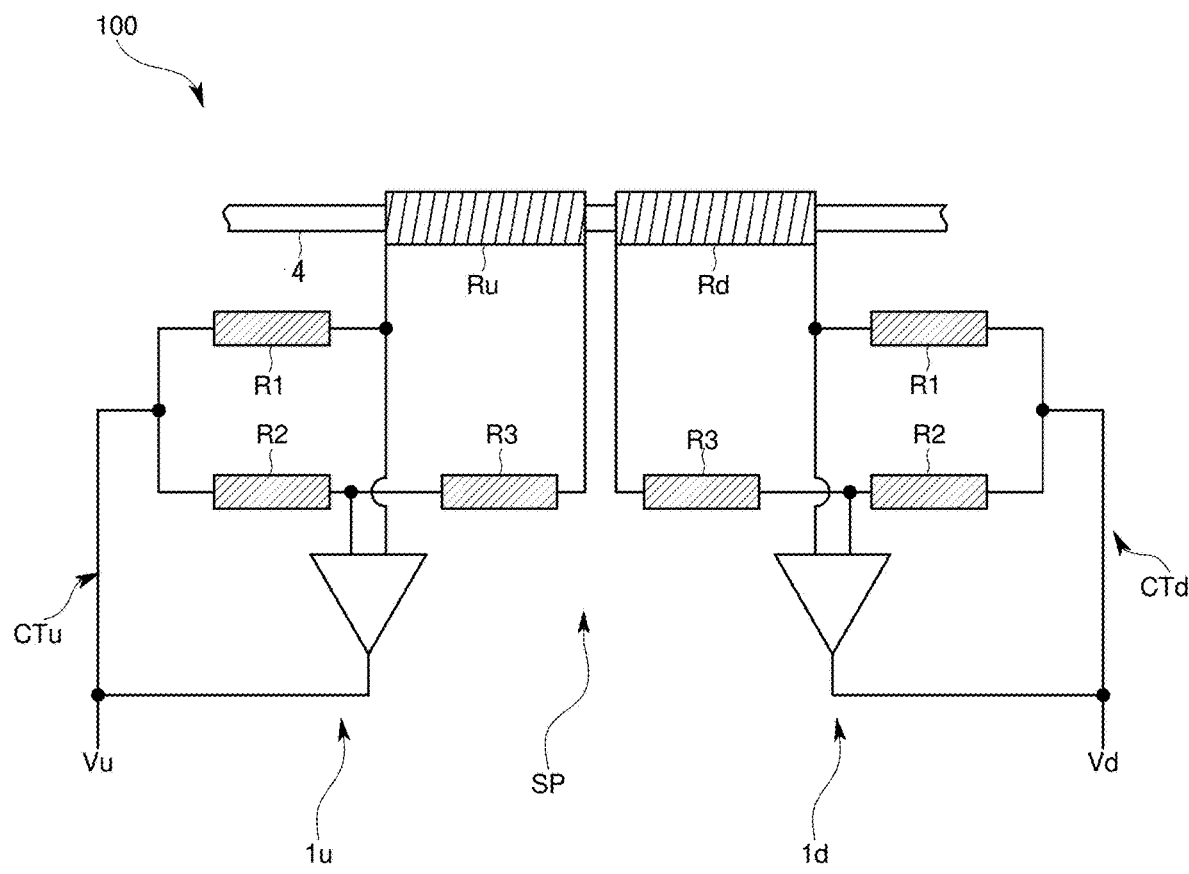
FIG. 3 is a schematic diagram showing a sensing mechanism of the thermal flow meter according to the same embodiment.

As is shown in FIG. 3, the flow rate detector circuit SP is a heating resistance wire whose electrical resistance value increases or decreases in conjunction with changes in temperature. The flow rate detector circuit SP is formed by an upstream-side electrical resistance element Ru in the form of a coil that is wound around an outer circumferential surface of the narrow tube forming the sensor flow path 4, and by a downstream-side electrical resistance element Rd in the form of a coil that is wound around the sensor flow path 4 on the downstream side from the upstream-side electrical resistance element Ru. Here, the upstream-side electrical resistance element and the downstream-side electrical resistance element each operate as both a heater and a temperature sensor.

Furthermore, the flow rate detector circuit SP is a constant temperature drive type of circuit and, as is shown in FIG. 3, includes an upstream-side constant temperature control circuit CTu that is formed by a bridge circuit of which a part is formed by the upstream-side electrical resistance element Ru, and a downstream-side constant temperature control circuit CTd that is formed by a bridge circuit of which a part is formed by the downstream-side electrical resistance element Rd.

The upstream-side constant temperature control circuit CTu is formed by an upstream-side bridge circuit in which a series resistor group that is made up of the upstream-side electrical resistance element Ru and a temperature-setting resistor R1 that is connected in series to this upstream-side electrical resistance element Ru is connected in parallel with a series resistor group in which two fixed resistors R2 and R3 are connected in series, and by a feedback control circuit in the form of an operational amplifier that feeds a difference (Vu) between a potential at a connection point between the upstream-side electrical resistance element Ru and the temperature-setting resistor R1 and a potential at a connection point between the two fixed resistors back to the upstream-side bridge circuit so as to maintain the balance of the upstream-side bridge circuit.

In the same way as the upstream-side constant temperature control circuit CTu, the downstream-side constant temperature control circuit CTd is formed by a downstream-side bridge circuit in which a series resistor group that is made up of the downstream-side electrical resistance element Rd and the temperature-setting resistor R1 that is connected in series to this downstream-side electrical resistance element Rd is connected in parallel with a series resistor group in which the two fixed resistors R2 and R3 are connected in series, and by a feedback control circuit in the form of an operational amplifier that feeds a difference (Vd) between a potential at a connection point between the downstream-side electrical resistance element Rd and the temperature-setting resistor R1 and a potential at a connection point between the two fixed resistors back to the downstream-side bridge circuit so as to maintain the balance of the downstream-side bridge circuit.

Here, the material used for the upstream-side electrical resistance element Ru has the same temperature coefficient of resistance as the material used for the downstream-side electrical resistance element Rd. In addition, the upstream-side electrical resistance element Ru and the downstream-side electrical resistance element Rd are both feedback-controlled by their respective feedback control circuits so that they have the same resistance value as the temperature-setting resistor R1. In other words, because their resistance value is kept constant, the respective voltages Vu and Vd are controlled so that the temperatures of the upstream-side electrical resistance element Ru and the downstream-side electrical resistance element Rd are also kept constant. In the present embodiment, Vu and Vd are used as an upstream-side voltage Vu and a downstream-side voltage Vd which are voltages that are applied in order to cause the upstream-side electrical resistance element Ru and the downstream-side electrical resistance element Rd to generate heat.

Figure 4:
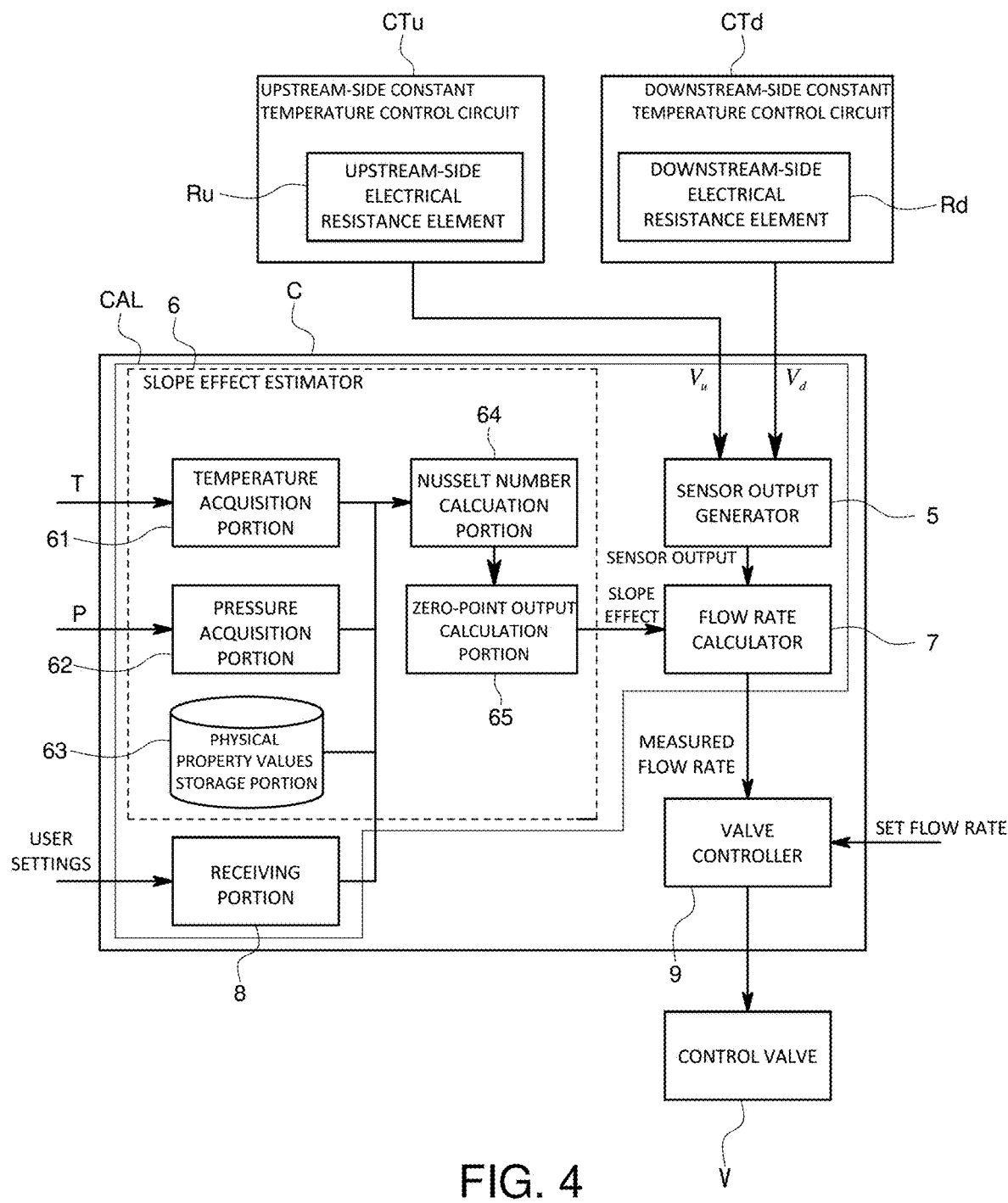
FIG. 4 is a function block diagram of the thermal flow meter and mass flow controller according to the same embodiment.

As is shown in FIG. 4, the thermal flow meter 100 is additionally provided with the aforementioned calculator CAL that calculates the flow rate of a gas from the upstream-side voltage Vu and the downstream-side voltage Vd that are output from the flow rate detector circuit SP. The calculator CAL is formed so as to take $(Vu-Vd)/(Vu+Vd)$ as the sensor output, and so as to correct any error in the zero-point output that is caused by a thermosiphon effect generated in a case in which the flow rate control device 200 is, for example, disposed vertically.

Figure 5:
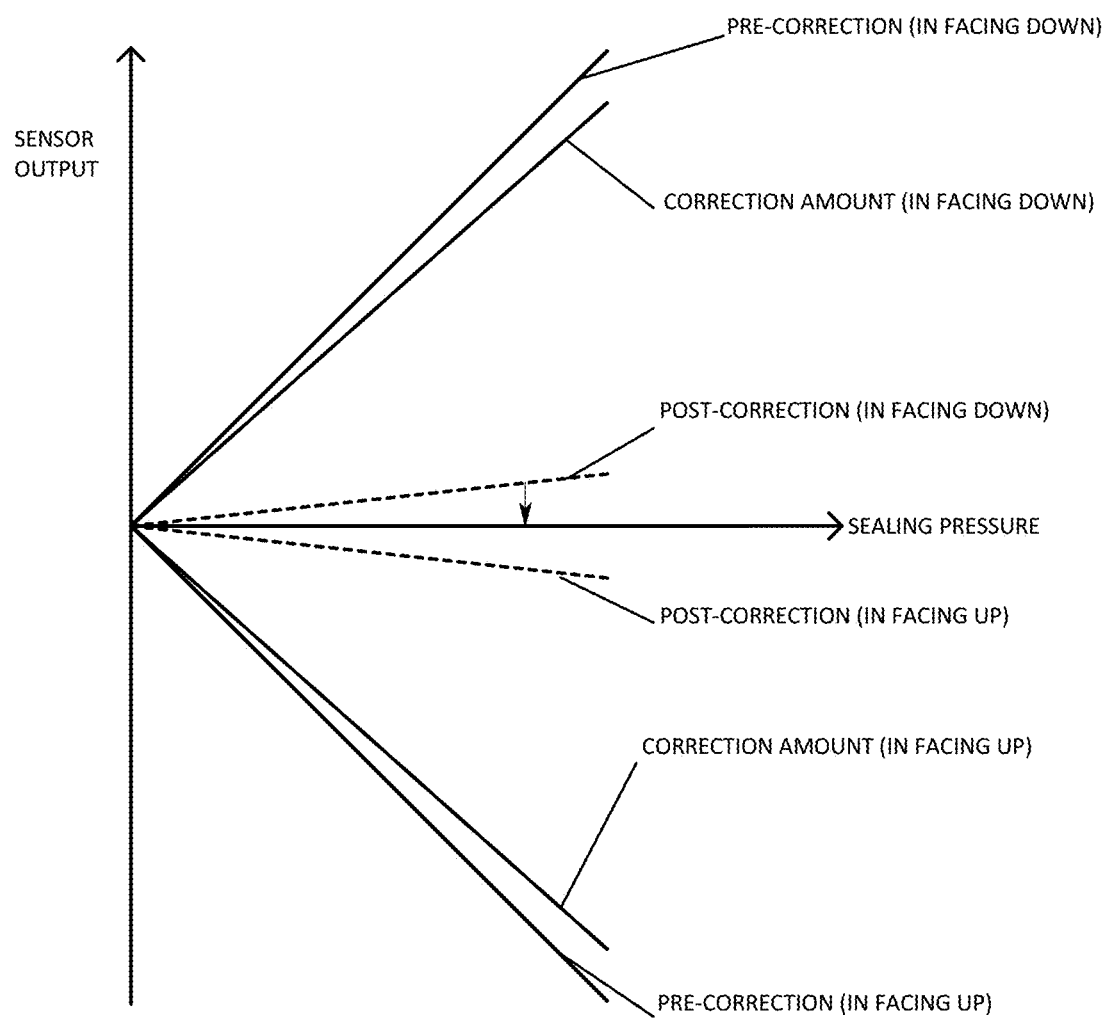
FIG. 5 is a conceptual view showing a correction of a slope effect in a sensor output according to the same embodiment.

Here, an outline of the zero-point output correction function performed by the calculator CAL is shown in FIG. 5. In a case in which the flow rate control device 200 has been disposed vertically so that a gas inflow port IN faces downwards, then even in a case in which there is no inflow or outflow of gas to the flow rate control device 200, due to convection of the gas that is generated within the sensor flow path 4, a gas flow is generated from the upstream-side electrical resistance element Ru towards the downstream-side electrical resistance element Rd. Because of this, in a case in which the gas inflow port IN faces downwards, a positive value error is generated in the pre-correction sensor output. Moreover, in the pre-correction sensor output, the error in the zero-point output increases proportionally as the pressure of the gas sealed inside the flow rate control device 200 increases. In the same way, in a case in which the inflow port IN of the flow rate control device 200 faces upwards, because a flow from the downstream-side electrical resistance element Rd towards the upstream-side electrical resistance element Ru due to convection is detected, the pre-correction sensor output becomes a negative value and an error is generated. In this case as well, the error in the zero-point output increases proportionally as the pressure of the gas sealed inside the flow rate control device 200 increases.

The calculator CAL is formed so as to estimate a slope effect, which is an error in the zero-point output in each state, and to cause the slope effect to approximate the actual flow rate by correcting the slope effect from the pre-correction sensor output.

The structure of the calculator CAL will now be described in detail with reference to the function block diagram shown in FIG. 4.

The calculator CAL performs at least the functions of a sensor output generator 5, a slope effect estimator 6, a flow rate calculator 7, and a receiving portion 8.

The sensor output generator 5 is formed so as to receive inputs of the upstream-side voltage Vu and the downstream-side voltage Vd, which are voltages that are applied to the upstream-side electrical resistance element Ru and the downstream-side electrical resistance element Rd, and to then calculate and output (Vu−Vd)/(Vu+Vd) as the sensor output. Here, the voltage differential (Vu−Vd) is a value that changes in accordance with the flow rate of the gas flowing through the sensor flow path 4, and a voltage sum (Vu+Vd) corresponds to a temperature index of the gas flowing through the sensor flow path 4. By dividing the voltage differential by the voltage sum, the temperature effect on the flow rate is corrected in this sensor output.

The slope effect estimator 6 estimates a slope effect that is generated in the sensor output in accordance with the attitude of the sensor flow path 4 based on at least the Prandtl number of the gas being measured. In the present embodiment, the slope effect estimator 6 estimates the slope effect based not only on the Prandtl number, but also on the Nusselt number and the Grashof number of the gas. Moreover, the pressure and temperature of the gas, which are obtained from various sensors provided within the flow rate control device 200 or from various sensors provided separately for the semiconductor manufacturing process, are also input into the slope effect estimator 6, and the slope effect estimator 6 outputs a slope effect based on these values.

The slope effect estimator 6 calculates the Prandtl number from the temperature, pressure, and physical property values of the gas, and calculates the Nusselt number from the Grashof number. In addition, based on a relational expression between the value of the Nusselt number and the voltage differential (Vu−Vd) forming a portion of the sensor output, the slope effect estimator 6 estimates a voltage differential (Vu0−Vd0) in a state in which there is no flow as the slope effect. In order to perform these functions, the slope estimator 6 is provided with at least a temperature acquisition portion 61, a pressure acquisition portion 62, a physical property values storage portion 63, a Nusselt number calculating portion 64, and a zero-point output calculating portion 65.

The temperature acquisition portion 61 acquires an output signal from a temperature sensor (not shown in the drawings) that is provided, for example, in the block body 1 of the flow rate control device 200 as the temperature of the gas, and outputs this temperature to the Nusselt number calculating portion 64. Note that it is also possible for the temperature acquisition portion 61 to acquire information from another temperature sensor that is provided on the line to which the flow rate control device 200 is connected.

The pressure acquisition portion 62 acquires an output signal from a pressure sensor (not shown in the drawings) that measures the pressure of the gas present within the main flow path of the flow rate control device 200. The pressure sensor may be provided, for example, in the actual flow rate control device 200 itself so as to measure the pressure of the gas flowing through the main flow path, or may be provided on a flow path that connects on-off valves (not shown in the drawings) that are provided upstream and downstream respectively from the flow rate control device 200 to the flow rate control device 200. The pressure of the gas sealed inside the flow rate control device 200 that the pressure acquisition portion 62 outputs to the Nusselt number calculating portion 64 is a pressure that is acquired in a state in which, for example, the respective on-off valves are both closed, and there is no inflow or outflow of gas in relation to the flow rate control device 200.

Figure 6:
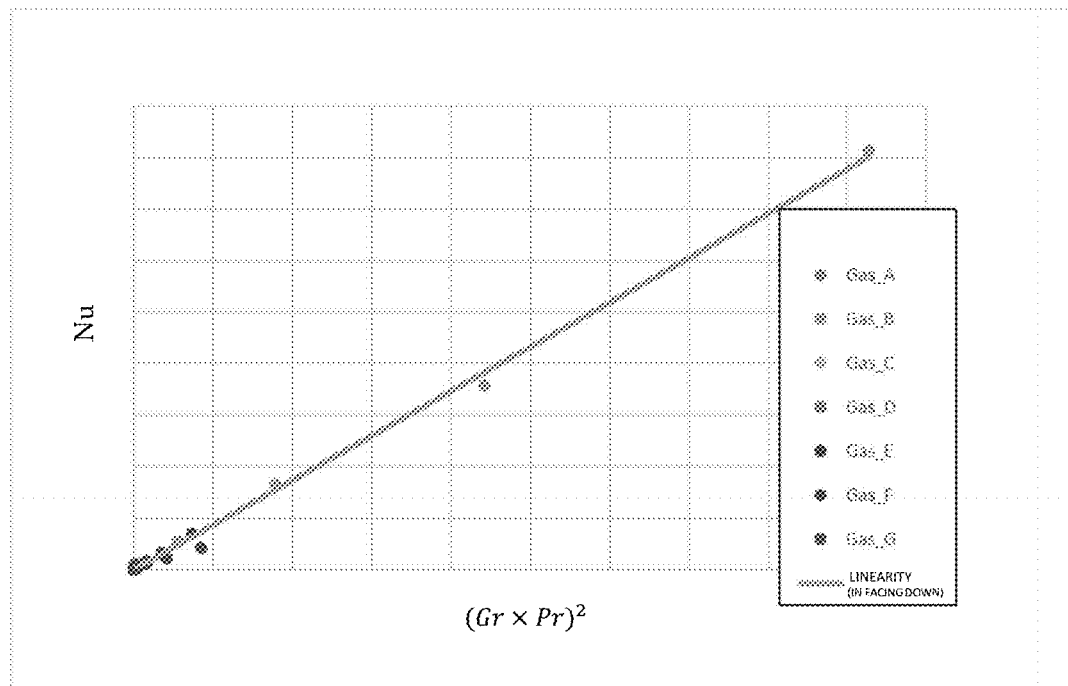
FIG. 6 contains graphs showing measurement results showing relationships between a Nusselt number, a Grashof number, and a Prandtl number according to the same embodiment.
Figure 6:
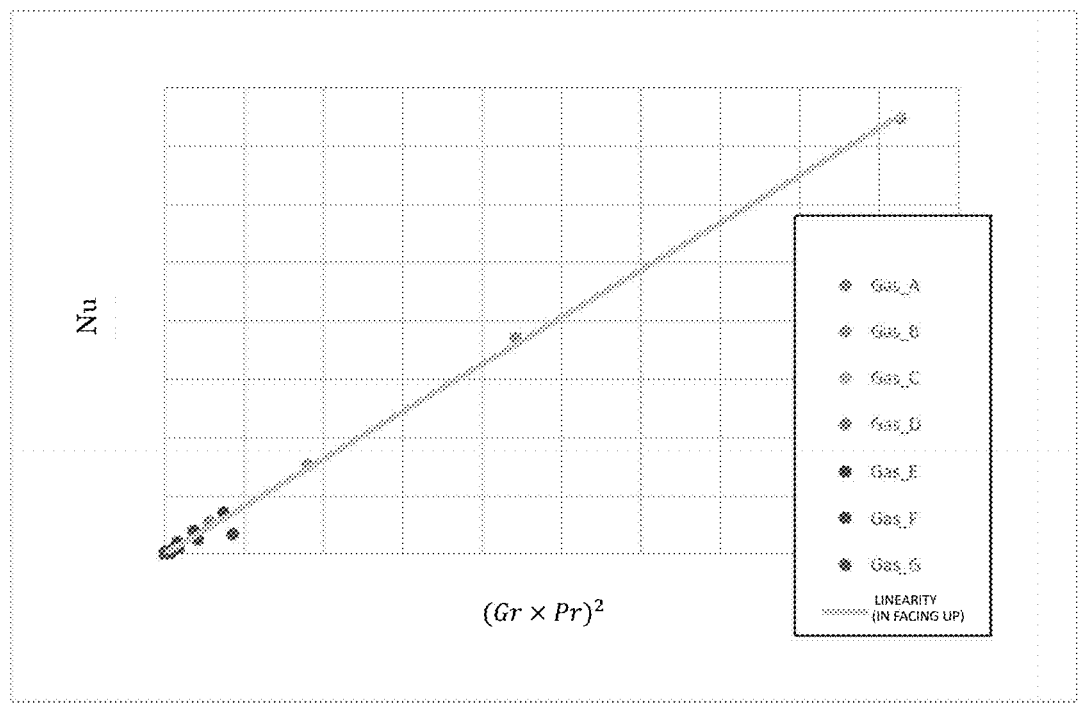

In a case in which the Nusselt number is denoted by Nu, the Grashof number is denoted by Gr, the Prandtl number is denoted by Pr, the constant of proportionality is denoted as A, and the index is denoted by n, then the Nusselt number calculating portion 64 calculates the value of the Nusselt number Nu based on $Nu=A(Gr \times Pr)^n$. Here, in the present embodiment, the constant of proportionality A is taken as 1, and the index n is taken as 2. This is because it was discovered by the inventors of the present application from the experiment results shown in FIG. 6 that, in a case in which values such as these are employed, the Nusselt number Nu can be calculated from the product of the Grashof number Gr and the Prandtl number Pr.

Figure 7:
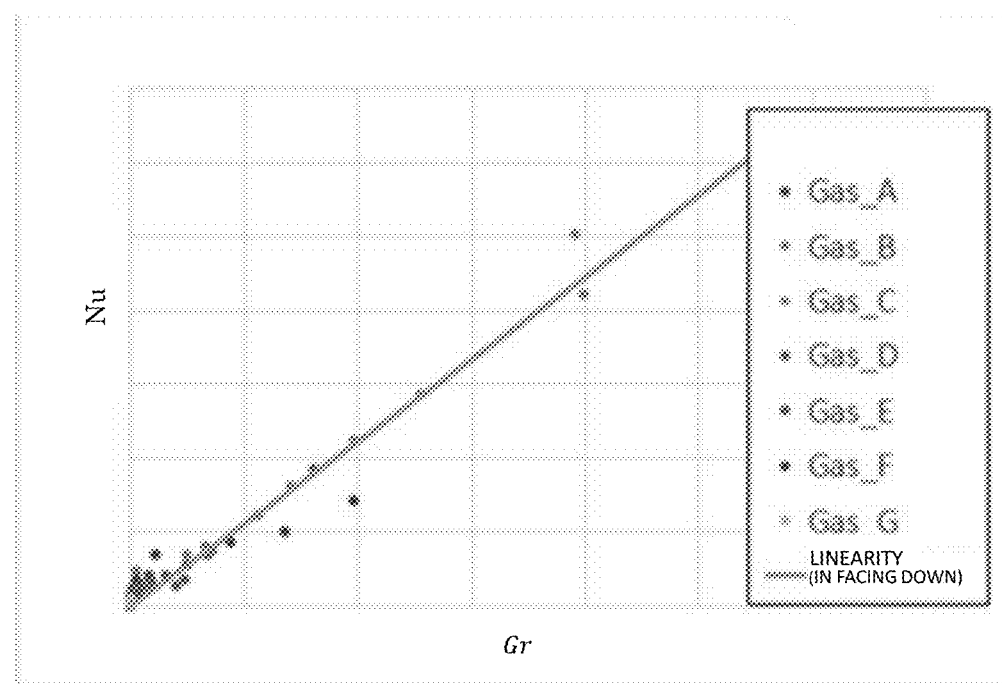
FIG. 7 contains graphs showing measurement results showing a relationship between only a Grashof number and a Nusselt number.
Figure 7:
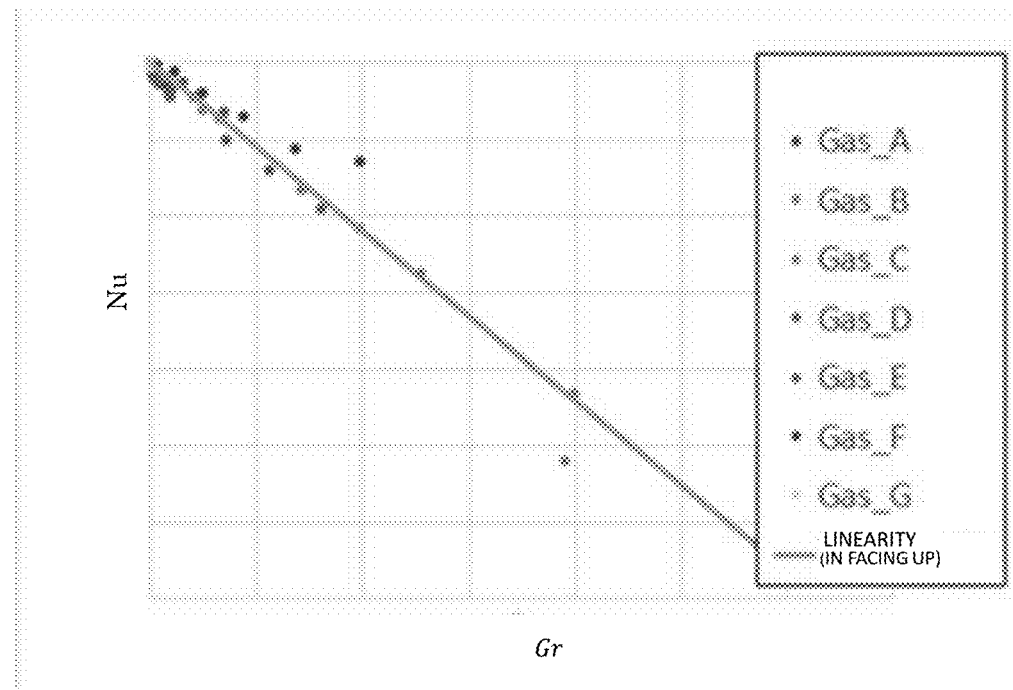

Here, the accuracy when estimating the Nusselt number Nu in a case in which the Prandtl number Pr is not used will be described based on the measurement results shown in FIG. 7. Note that in order to enable an easier comparison to be made between the graphs shown in FIG. 6 and FIG. 7, intervals between the auxiliary lines of the respective axes thereof have been adjusted so the unit quantities thereof are substantially the same. As is shown in FIG. 7, although a correlation exists between the Nusselt number Nu and the Grashof number Gr, in those regions where the value of the Grashof number is small, there is increased scattering of the Nusselt number Nu relative to the Grashof number Gr. In other words, even if an approximate straight line is calculated between the Grashof number Gr and the Nusselt number Nu, and the Nusselt number Nu is estimated from the Grashof number Gr based on this approximate straight line, compared with a case in which the Nusselt number Nu is estimated from $(Gr \times Pr)^2$, as is the case in the present embodiment, the estimation accuracy is markedly inferior. From the results obtained by comparing FIG. 6 and FIG. 7, it can be confirmed that a method of calculating the Nusselt number Nu using $(Gr \times Pr)^2$ is suitable for the structure of the thermal flow meter 100 of the present embodiment.

The method of calculating the Nusselt number Nu of the present embodiment will now be described in further detail. In a case in which an internal diameter of the sensor flow path 4 is denoted by L, a resistance value of the upstream-side electrical resistance element Ru or the downstream-side electrical resistance element Rd is denoted by R, a thermal conductivity of the fluid being measured is denoted by $\lambda$, a molar specific heat at constant pressure of the fluid being measured is denoted by Cp, a viscosity of the fluid being measured is denoted by $\eta$, a density of the fluid being measured is denoted by $\rho$, a gravitational acceleration is denoted by g, a volumetric expansion of the fluid being measured is denoted by $\beta$, and a temperature differential between the upstream-side electrical resistance element Ru or the downstream-side electrical resistance element Rd and the fluid being measured is denoted by ΔT, then the Grashof number Gr and the Prandtl number Pr are expressed respectively by the following.

$Pr=Cp\eta/\lambda$, and $Gr=\rho g L^3 \beta \Delta T/\eta^2$.

Based on information such as the type of gas which the receiving portion 8 has received from a user, and on the pressure and temperature thereof acquired by the pressure acquisition portion 62 and the temperature acquisition portion 61, the Nusselt number Nu calculating portion 64 reads the molar specific heat at constant pressure Cp, the volumetric expansion β, and the density ρ and the like stored in the physical property values storage portion 63. Next, the Nusselt number Nu calculating portion 64 substitutes each of the read physical property values, as well as the acquired pressure and temperature, into the above-described calculation formulae for the Grashof number Gr and the Prandtl number Pr, and calculates the respective values. Finally, the Nusselt number Nu calculating portion 64 calculates a square of the product of the Grashof number Gr and the Prandtl number Pr as the Nusselt number Nu. The Nusselt number Nu thus calculated is then output to the zero-point output calculating portion 65.

The zero-point output calculating portion 65 calculates the slope effect based on a relational expression between the voltage differential (Vu0−Vd0) in a state in which there is no slope effect in the form of a flow and the Nusselt number Nu. More specifically, in a case in which the internal diameter of the sensor flow path 4 is denoted by L, the resistance value of the upstream-side electrical resistance element Ru or the downstream-side electrical resistance element Rd is denoted by R, the thermal conductivity of the fluid being measured is denoted by λ, and the temperature differential between the upstream-side electrical resistance element Ru or the downstream-side electrical resistance element Rd and the fluid being measured is denoted by ΔT, then based on Nu=L× $((Vu0-Vd0)^2/R)/(L^2 \times \Delta T)/\lambda$, the zero-point output calculating portion 65 calculates the voltage differential (Vu0−Vd0). Here, the positivity or negativity of (Vu0−Vd0) is determined in such a way that (Vu0−Vd0) is positive in a case in which the gas intake port of the flow rate control device 200 is on the lower side, and is negative in a case in which the gas intake port is on the upper side.

The flow rate calculator 7 corrects the slope effect estimated by the slope effect estimator 6 for the pre-correction sensor output (Vu−Vd)/(Vu+Vd) output from the sensor output generator 5, and then calculates the flow rate of the gas based on the corrected sensor output. In other words, the flow rate calculator 7 calculates the flow rate by correcting any shift in the zero-point output by subtracting the slope effect (Vu0−Vd0) from the pre-correction voltage differential (Vu−Vd), and substituting the corrected sensor output {(Vu−Vd)−(Vu0−Vd0)}/(Vu+Vd) into a predetermined flow rate calculation function. More specifically, if the flow rate is denoted by F and the flow rate calculation function is denoted by Sens(X), then the flow rate is converted into F=Sens({(Vu−Vd)−(Vu0−Vd0)}/(Vu+Vd)).

Figure 8:
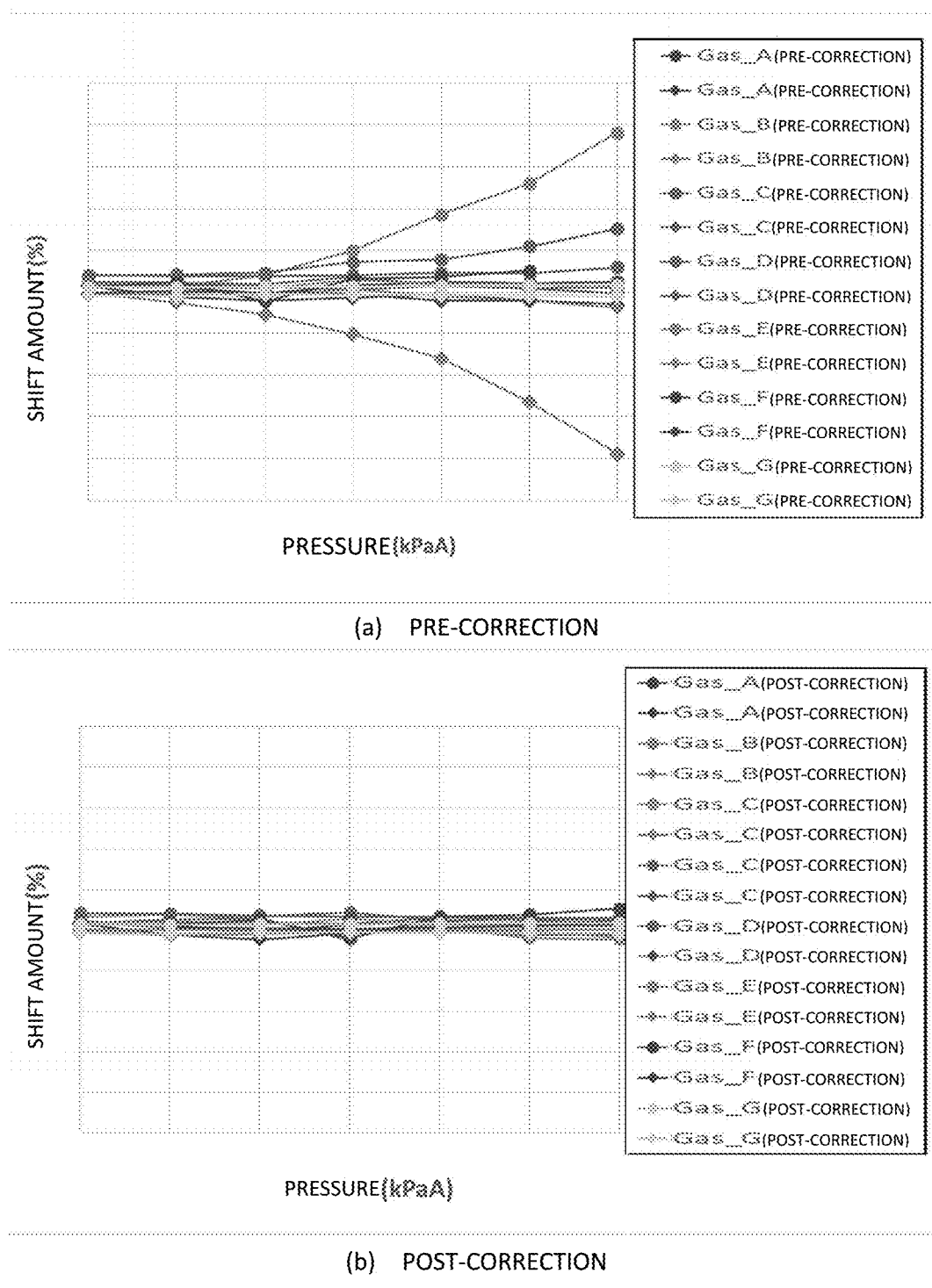
FIG. 8 contains graphs showing experiment results in a case in which a zero-point output is corrected based on a Nusselt number calculated from a Prandtl number and a Grashof number according to the same embodiment.

According to the thermal flow meter 100 and the flow rate control device 200 that are formed in this manner, as is shown in the graph in FIG. 8, a slope effect that appears for a sensor output can be accurately corrected so that an accurate flow rate is obtained. Here, the actual measurement results shown in FIG. 8 contain two sets of measurement results for a plurality of types of gas. One set of measurement results is for the inflow port IN facing upwards, while the other set is for when the inflow port IN faces downwards. As is shown in FIG. 8 at (a), depending on the gas type, there is a marked increase in the amount of shift in the zero-point output proportionally as the sealing pressure within the flow rate control device 200 becomes higher. In contrast, as is shown in FIG. 8 at (b), by employing the correction method of the present embodiment, a sizable decrease can be achieved in the amount of shift in the zero-point output irrespective of the type of gas and sealing pressure. It is thought that this is due to the fact that, because the slope effect estimator 6 estimates the slope effect based on a Prandtl number, which is a value that is affected by the pressure and thermal conductivity of a fluid, not only can the actual size itself of the convection generated by a thermosiphon effect be corrected, but the differing effects on the zero-point output caused by differences between the ease of heat propagation depending on the gas type can also be corrected.

Figure 9:
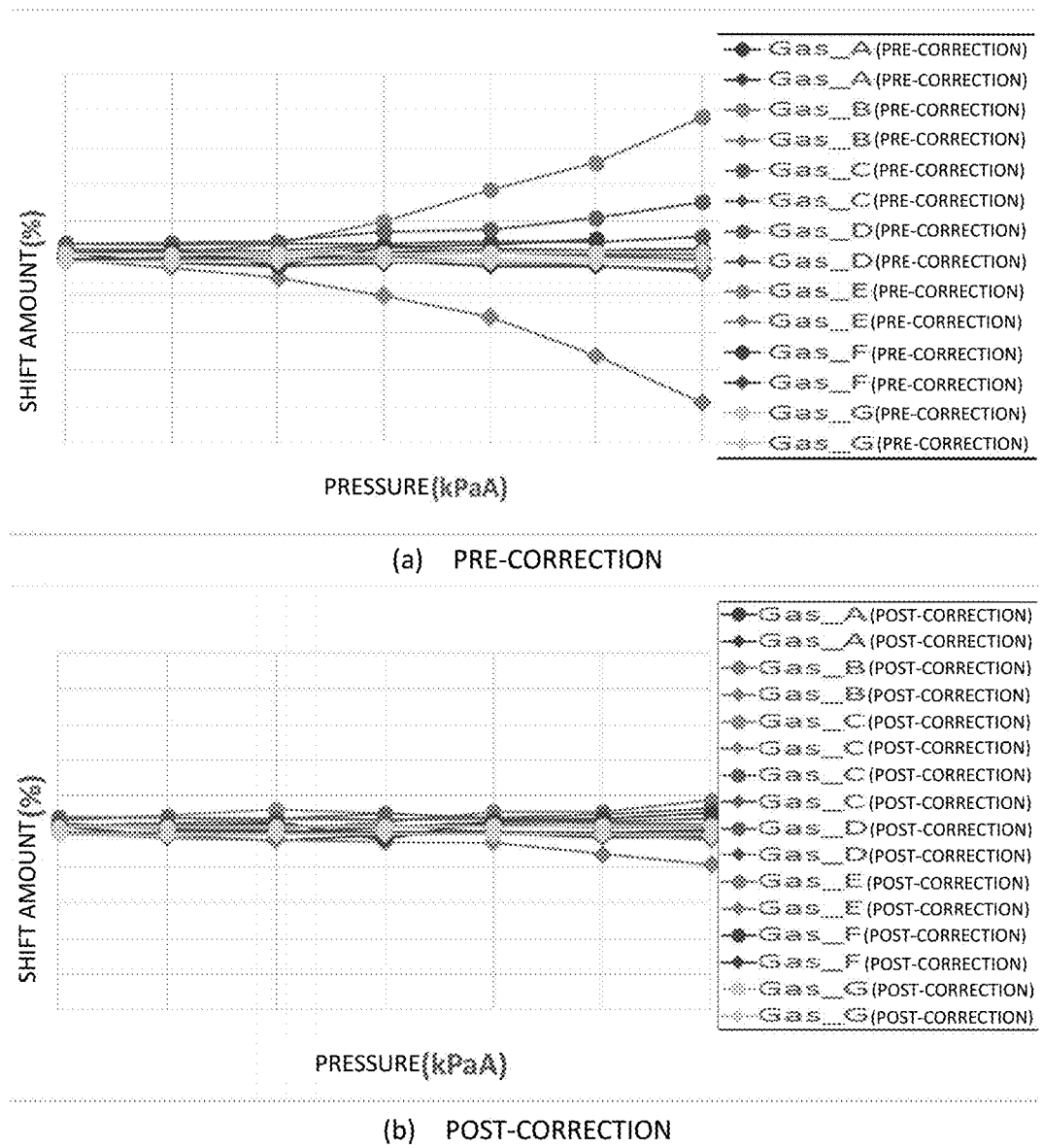
FIG. 9 contains graphs showing experiment results in a case in which a zero-point output is corrected based on a Nusselt number calculated using only a Grashof number and without using a Prandtl number.

Here, as a comparative example, the results obtained when the zero-point output was corrected by calculating the Nusselt number Nu using only the Grashof number Gr and without using the Prandtl number Pr, as was shown in FIG. 7, are shown in FIG. 9. Note that, in order to enable an easier comparison to be made between the graphs shown in FIG. 8 and FIG. 9, intervals between the auxiliary lines of the respective axes thereof have been adjusted so the unit quantities thereof are substantially the same. Compared with the zero-point output in the case shown in FIG. 9 at (a) in which nothing has been corrected, as is shown in FIG. 9 at (b), it is possible to correct the zero-point output to a certain extent even in a case in which only the Grashof number Gr is used. However, as can be understood by comparing FIG. 8 at (b) and FIG. 9 at (b), it can be confirmed that using the Prandtl number Pr as well, as is the case in the present embodiment, enables the correction accuracy, particularly in areas where the sealed-in pressure, is high to be improved. In this way, by employing the thermal flow meter 100 of the present embodiment, it is possible to correct a zero-point output with a high degree of accuracy regardless of the type of gas and regardless of the pressure of the sealed-in gas.

Moreover, because the slope effect estimator 6 is able, based on the pressure and temperature of a gas and on the respective physical property values of a gas, to calculate the size of a slope effect and, in a case in which information about the mounting orientation of the flow rate control device 200 has been input, to also determine the positivity or negativity that appears as a zero-point output, it is no longer necessary to employ an additional sensor such as a gyro sensor that is not normally employed in the flow rate control device 200.

In other words, without making any hardware modifications from a normal thermal flow meter, simply by making software modifications it is possible to accurately correct measurement errors that are caused by a thermosiphon effect.

Additional embodiments will now be described.

The structure of the slope effect estimator is not limited to the structure described in the foregoing embodiment. Namely, it is acceptable for the slope effect estimator to estimate a slope effect based at least on the Prandtl number of a fluid. For example, it is also possible for the slope effect estimator to estimate a slope effect based on a relational expression between the Prandtl number and a voltage differential (Vu0−Vd0) that shows an error in the zero-point output. Alternatively, it is also possible for the slope effect estimator to be formed in such a way as to estimate a slope effect based on a relational expression between the Nusselt number and the Prandtl number without using the Grashof number.

The way in which a slope effect is expressed is not limited to being a voltage differential (Vu0−Vd0). For example, it is also possible to individually calculate each of the zero-point output Vu0 and the zero-point output Vd0 so that the upstream-side voltage Vu and the downstream-side voltage Vd can both be individually corrected. If this type of structure is employed, then the temperature index Vd+Vu can also be corrected.

The mounting orientation of the flow rate control device and the type of fluid (gas) that is being measured are set in advance by a user via the receiving portion, however, it is also possible for this information to be acquired automatically by the flow rate control device. For example, it is also possible to employ a structure in which the flow rate control device is provided with a gyro sensor, and for the orientation of the intake port of a fluid and the attitude of the sensor flow path to be acquired so that the positivity or negativity of the slope effect can be set automatically. In addition, it is also possible for the amount of correction of the slope effect to be changed in accordance with the slope angle. Moreover, because it is possible to estimate the thermal conductivity of the fluid flowing through the flow path from the temperature index Vu+Vd, it is also possible to identify the type of fluid from this type of value and to consequently obtain other physical property values that are required.

The thermal flow meter correction method of the present invention is not limited to being used in a constant temperature drive system, and may also be applied, for example, in a constant current drive system as well as in other types of systems. For example, in a thermal flow meter in a constant current drive system, it is sufficient if the current detection circuit is provided with a bridge circuit that includes the above-described upstream-side electrical resistance element and the above-described downstream-side electrical resistance element, and with a constant current circuit that supplies a constant current to this bridge circuit.

In addition to these, various other modifications and combinations of embodiments can be made insofar as they do not depart from the spirit or scope of the present invention.

Industrial Applicability

According to the present invention, it is possible to provide a thermal flow meter that takes into account the effects on a slope effect that are due to pressure and to differences between the thermal conductivities of fluids and is thereby able to correct errors occurring when measuring a flow rate that are caused by a thermosiphon effect at a greater level of accuracy than is possible conventionally.

What is claimed is:
1. A thermal flow meter comprising:
a sensor flow path along which flows a fluid being measured;
an upstream-side electrical resistance element that is provided on the sensor flow path;
a downstream-side electrical resistance element that is provided on the sensor flow path on the downstream side from the upstream-side electrical resistance element;
a sensor output generator that, based on voltages output from a flow rate detector circuit that includes the upstream-side electrical resistance element and the downstream-side electrical resistance element, generates a sensor output in accordance with the flow rate of the fluid being measured;
a slope effect estimator that, based on at least a Prandtl number of the fluid being measured, estimates a slope effect that is generated in the sensor output in accordance with an attitude of the sensor flow path; and
a flow rate calculator that corrects the slope effect from the sensor output, and calculates the flow rate of the fluid being measured.

2. The thermal flow meter according to claim 1, wherein the slope effect estimator is formed so as to estimate the slope effect based on a Nusselt number, a Grashof number, and a Prandtl number of the fluid being measured.

3. The thermal flow meter according to claim 2, wherein, in a case in which a Nusselt number is denoted by Nu, a Grashof number is denoted by Gr, a Prandtl number is denoted by Pr, a constant of proportionality is denoted as A, and an index is denoted by n, then the slope effect estimator may be formed so as to calculate the slope effect based on $Nu=A(Gr \times Pr)^n$.

4. The thermal flow meter according to claim 3, wherein, in a case in which an upstream-side voltage output from a circuit that includes the upstream-side electrical resistance element is denoted by Vu, and a downstream-side voltage output from a circuit that includes the downstream-side electrical resistance element is denoted by Vd, the sensor output generator is formed so as to output (Vu−Vd)/(Vu+Vd) as the sensor output,
the slope effect is a voltage differential (Vu0−Vd0) generated by a convection within the sensor flow path, and the slope effect estimator is formed so as to estimate the voltage differential (Vu0−Vd0) from a value of the Nusselt number that is calculated from a relational expression between the Nusselt number Nu and the voltage differential (Vu0−Vd0), and from $Nu=A(Gr \times Pr)^n$, and
the flow rate calculator corrects the slope effect by subtracting the voltage differential (Vu0−Vd0) from a numerator of the sensor output (Vu−Vd).

5. The thermal flow meter according to claim 4, wherein the index n is 2.

6. The thermal flow meter according to claim 4, wherein, in a case in which an internal diameter of the sensor flow path is denoted by L, a resistance value of the upstream-side electrical resistance element or the downstream-side electrical resistance element is denoted by R, a thermal conductivity of the fluid being measured is denoted by λ, a molar specific heat at constant pressure of the fluid being measured is denoted by Cp, a viscosity of the fluid being measured is denoted by η, a density of the fluid being measured is denoted by ρ, a gravitational acceleration is denoted by g, a volumetric expansion of the fluid being measured is denoted by β, and a temperature differential between the upstream-side electrical resistance element or the downstream-side electrical resistance element and the fluid being measured is denoted by ΔT, then $$Nu=L \times \{((Vu0-Vd0)^2/R)/(L^2 \times \Delta T)\}/\lambda,$$

$$Pr=Cp\eta/\lambda, \text{ and}$$

$$Gr=\mu g L^3 \beta \Delta T/\eta^2.$$

7. The thermal flow meter according to claim 2, wherein the slope effect estimator comprises:
a pressure acquisition portion that acquires a pressure P of the fluid being measured;

a temperature differential acquisition portion that acquires the temperature differential $\Delta T$ between the upstream-side electrical resistance element or the downstream-side electrical resistance element and the fluid being measured;

a Nusselt number calculating portion that, based on the acquired pressure P and temperature differential $\Delta T$, calculates the Grashof number Gr and the Prandtl number Pr, and then, by substituting the respective values into a formula $Nu=A(Gr \times Pr)^n$, calculates a value of the Nusselt number Nu; and a zero-point output calculating portion that calculates the voltage differential (Vu0−Vd0) from the calculated value of the Nusselt number Nu.

8. The thermal flow meter according to claim 1, wherein the flow rate detector circuit comprises:
   an upstream-side constant temperature control circuit having a bridge circuit that includes the upstream-side electrical resistance element; and
   a downstream-side constant temperature control circuit having a bridge circuit that includes the downstream-side electrical resistance element.

9. The thermal flow meter according to claim 1, wherein the flow rate detector circuit comprises:
   a bridge circuit that includes the upstream-side electrical resistance element and the downstream-side electrical resistance element; and
   a constant current circuit that supplies a constant current to the bridge circuit.

10. A flow rate control device comprising:
    the thermal flow meter according to claim 1;
    a fluid control valve; and
    a valve controller that, based on a deviation between a set flow rate and a flow rate of a fluid being measured that has been output by the thermal flow meter, controls an aperture of the fluid control valve.

11. A thermal flow rate measurement method in which a thermal flow meter that includes a sensor flow path along which flows a fluid being measured, an upstream-side electrical resistance element that is provided on the sensor flow path, and a downstream-side electrical resistance element that is provided on the sensor flow path on the downstream side from the upstream-side electrical resistance element is employed, and in which,
    based on voltages output from a flow rate detector circuit that includes the upstream-side electrical resistance element and the downstream-side electrical resistance element, a sensor output is generated in accordance with the flow rate of the fluid being measured, and,
    based on at least a Prandtl number of the fluid being measured, a slope effect that is generated in the sensor output in accordance with an attitude of the sensor flow path is estimated, and
    the slope effect is corrected from the sensor output, and the flow rate of the fluid being measured is calculated.

12. A non-transitory computer-readable storage medium storing a program for a thermal flow meter that is used in a thermal flow rate sensor that comprises: a sensor flow path along which flows a fluid being measured; an upstream-side electrical resistance element that is provided on the sensor flow path; and a downstream-side electrical resistance element that is provided on the sensor flow path on the downstream side from the upstream-side electrical resistance element, and that is characterized in causing a computer to perform functions of:
    a sensor output generator that, based on voltages output from a flow rate detector circuit that includes the upstream-side electrical resistance element and the downstream-side electrical resistance element, generates a sensor output in accordance with the flow rate of the fluid being measured;
    a slope effect estimator that, based on at least a Prandtl number of the fluid being measured, estimates a slope effect that is generated in the sensor output in accordance with an attitude of the sensor flow path; and
    a flow rate calculator that corrects the slope effect from the sensor output, and calculates the flow rate of the fluid being measured.

* * * * *